US009195169B2

(12) United States Patent
Kishida

(10) Patent No.: US 9,195,169 B2
(45) Date of Patent: Nov. 24, 2015

(54) IMAGE FORMING APPARATUS, CONSUMABLE MATERIAL UNIT, AND STORAGE MEDIUM

(71) Applicant: KYOCERA Document Solutions Inc., Osaka (JP)

(72) Inventor: Kentaro Kishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/316,309

(22) Filed: Jun. 26, 2014

(65) Prior Publication Data

US 2015/0002893 A1 Jan. 1, 2015

(30) Foreign Application Priority Data

Jun. 28, 2013 (JP) ................................ 2013-136027

(51) Int. Cl.
*G06F 15/00* (2006.01)
*G03G 15/08* (2006.01)

(52) U.S. Cl.
CPC .................................. *G03G 15/0863* (2013.01)

(58) Field of Classification Search
None
See application file for complete search history.

(56) References Cited

U.S. PATENT DOCUMENTS 7,860,427 B2 12/2010 Hayashi et al.
2007/0071458 A1 3/2007 Tanaka et al.
2008/0273883 A1* 11/2008 Kim et al. ....................... 399/12
2010/0008693 A1 1/2010 Hayashi et al.
2012/0229856 A1 9/2012 Karakawa
2014/0233967 A1* 8/2014 Suzuki ............................ 399/12
2014/0270814 A1* 9/2014 Ignatchenko et al. .......... 399/12

FOREIGN PATENT DOCUMENTS

JP 2002-108137 A 4/2002
JP 2007-122011 A 5/2007
JP 2007-199478 A 8/2007
JP 2008-216699 A 9/2008
JP 2010-020219 A 1/2010
JP 2012-189903 A 10/2012

OTHER PUBLICATIONS

An Office Action; "Notice of Reasons for Rejection," issued by the Japanese Patent Office on Sep. 15, 2015, which corresponds to Japanese Patent Application No. 2013-136027 and is related to U.S. Appl. No. 14/316,309.

* cited by examiner

*Primary Examiner* — Helen Q Zong
(74) *Attorney, Agent, or Firm* — Studebaker & Brackett PC

(57) ABSTRACT

An image forming apparatus forms an image on a sheet by using a consumable material contained in a consumable material unit. The consumable material unit includes a storage medium. The storage medium stores first information and second information. The image forming apparatus includes a control section and a reading section. The controlling section performs pre-processing. The pre-processing is for starting the image formation and performed based on the first information. The reading section reads the first information from the storage medium and transmits the first information to the control section before reading the second information. The first information is essential for the pre-processing. The second information is processable by the control section during or after the image formation.

14 Claims, 6 Drawing Sheets

IMAGE FORMING APPARATUS, CONSUMABLE MATERIAL UNIT, AND STORAGE MEDIUM

INCORPORATION BY REFERENCE

The present application claims priority under 35 U.S.C. §119 to Japanese Patent Application No. 2013-136027, filed Jun. 28, 2013. The contents of this application are incorporated herein by reference in their entirety.

BACKGROUND

The present disclosure relates to an image forming apparatus for forming an image on a sheet by using a consumable material (toner, for example) contained in a consumable material unit (toner container, for example) and also relates to a consumable material unit and a storage medium.

Some image forming apparatus uses a toner container that is provided with a built-in non-volatile memory. The non-volatile memory stores an identification code. When the toner container is replaced with a new one, the image forming apparatus determines whether or not the new toner container is a genuine product based on the identification code. On determining that the toner container is not a genuine product, the image forming apparatus displays a warning.

SUMMARY

An image forming apparatus according to a first aspect of the present disclosure forms an image on a sheet by using a consumable material contained in a consumable material unit. The consumable material unit includes a storage medium. The storage medium stores first information and second information. The image forming apparatus includes a control section and a reading section. The control section executes, based on the first information, processing for starting the image formation. The reading section reads the first information from the storage medium and transmits the first information to the control section before reading the second information. The first information is essential for the processing. The second information is processable by the control section during or after the image formation.

A consumable material unit according to a second aspect of the present disclosure is detachably mounted to an image forming apparatus that includes a control section and a reading section. The consumable material unit contains a consumable material that is to be supplied to the image forming apparatus. The consumable material unit includes a storage medium. The storage medium stores first information and second information. The image forming apparatus forms an image on a sheet by using the consumable material. The control section executes, based on the first information, processing for starting the image formation. The reading section reads the first information from the storage medium and transmits the first information to the control section before reading the second information. The first information is essential for the processing. The second information is processable by the control section during or after the image formation.

A storage medium according to a third aspect of the present disclosure is for attachment to a consumable material unit. The consumable material unit is detachably mounted to an image forming apparatus that includes a control section and a reading section. The storage medium stores first information and second information. The image forming apparatus forms an image on a sheet by using a consumable material contained in the consumable material unit. The control section executes, based on the first information, processing for starting the image formation. The reading section reads the first information and transmits the first information to the control section before reading the second information. The first information is essential for the processing. The second information is processable by the control section during or after the image formation.

DETAILED DESCRIPTION

The following describes an embodiment of the present disclosure with reference to the accompanying drawings. In the figures, the same or corresponding sections are denoted by the same reference signs, and a description of such sections is not repeated.

[Basic Principle]

Figure 1:
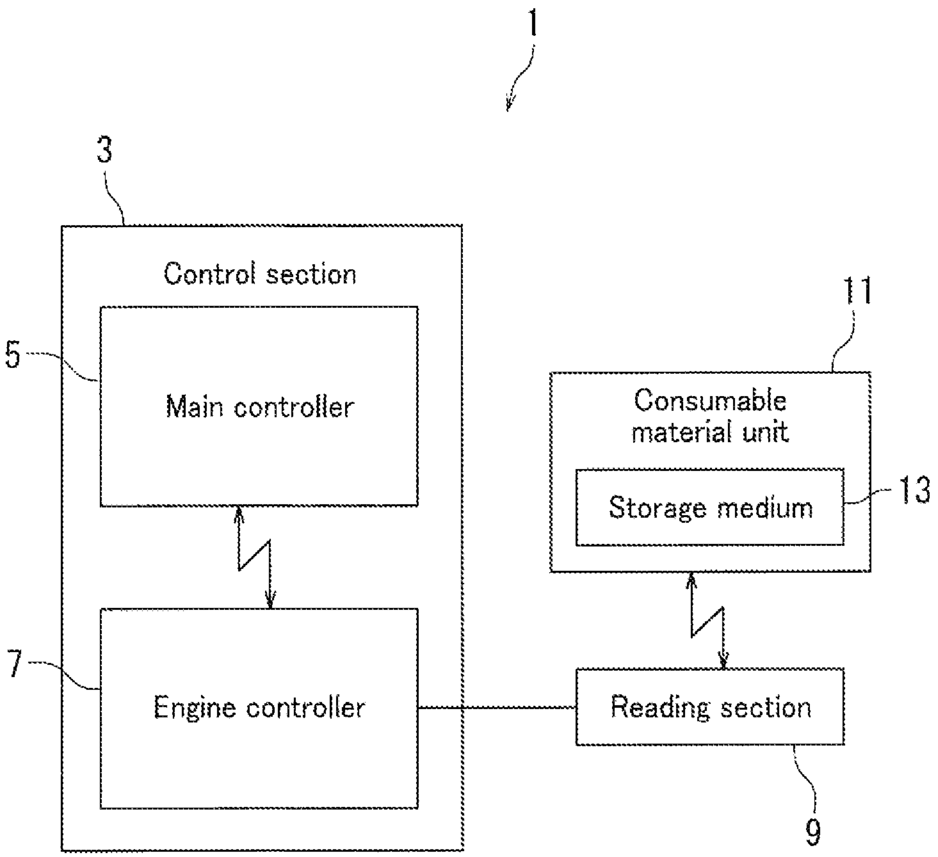
FIG. 1 is a block diagram showing important parts of an image forming apparatus according to an embodiment of the present disclosure.

FIG. 1 is a block diagram showing important parts of an image forming apparatus 1 according to the embodiment of the present disclosure. The image forming apparatus 1 forms an image on a sheet by using a consumable material contained in a consumable material unit 11. The consumable material unit 11 includes a storage medium 13. The storage medium 13 stores first information and second information. The image forming apparatus 1 includes a control section 3 and a reading section 9. The control section 3 performs pre-processing based on the first information. The pre-processing is for starting the image formation on a sheet. The reading section 9 reads the first information from the storage medium 13 and transmits the first information to the control section 3 before reading the second information. The first information is essential for the pre-processing. The second information is processable by the control section 3 during or after the image formation. The control section 3 includes a main controller 5 and an engine controller 7. A description of the main controller 5 and the engine controller 7 will be given later with reference to FIGS. 3 and 4.

According to the present embodiment, the reading section 9 reads the first information that is essential for the pre-processing and transmits the first information to the control section 3 before reading the second information that can be processed during or after the image formation. Thus, the control section 3 can start the pre-processing without having to wait for the second information to be transmitted from the reading section 9. Consequently, the time taken by the control section 3 to complete the pre-processing from the start of reading the first information by the reading section 9 (hereinafter, “preparation time”) is shortened as compared with the case where the pre-processing is started after both the first information and the second information are received.

[Overview of Processing]

Figure 2A:
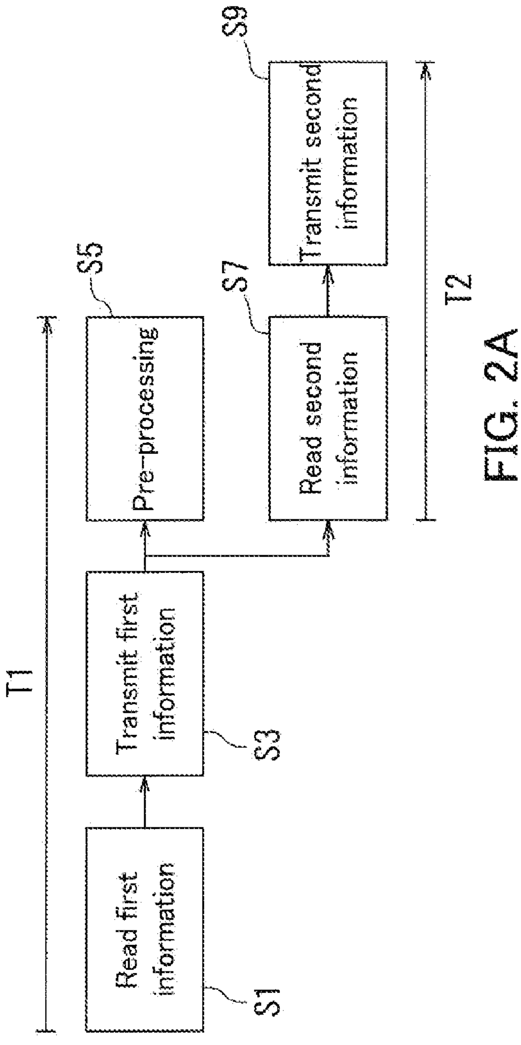
FIG. 2A shows an overview of processing performed by the image forming apparatus according to the embodiment of the present disclosure.
Figure 2B:
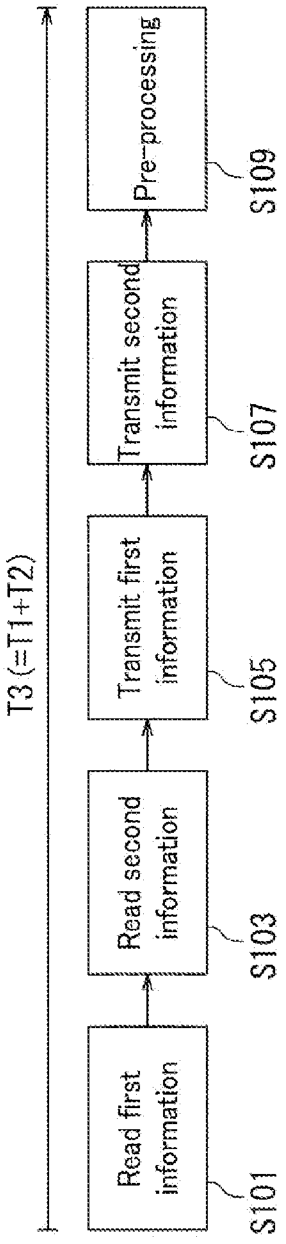
FIG. 2B shows an overview of processing performed by a typical image forming apparatus.

Reference is made to FIGS. 1, 2A and 2B. FIG. 2A shows an overview of processing performed by the image forming apparatus 1. FIG. 2B shows an overview of processing performed by a typical image forming apparatus (not shown). Note that the typical image forming apparatus does not belong to the prior art. In Step S1, the reading section 9 reads the first information from the storage medium 13. In Step S3, the reading section 9 transmits the first information to the control section 3. In Step S7, the reading section 9 reads the second information from the storage medium 13. In Step S9, the reading section 9 transmits the second information to the control section 3. In parallel with the reading of the second information (Step S7) by the reading section 9, the control section 3 performs the pre-processing in Step S5. Note that the pre-processing may be completed during Step S7 or may be continued until during Step S9.

In contrast, the typical image forming apparatus operates as follows. In Step S101, a reading section (not shown) reads first information from a storage medium (not shown). In Step S103, the reading section reads second information from the storage medium. In Step S105, the reading section transmits the first information to a control section (not shown). In Step S107, the reading section transmits the second information to the control section. The control section receives the first information and the second information and then performs the pre-processing in Step S109.

The following compares the image forming apparatus 1 and the typical image forming apparatus as to the preparation time. As shown in FIG. 2A, the time T1 is the preparation time taken by the image forming apparatus 1. In addition, the time T2 is taken for Steps S7 and S9. A shown in FIG. 2B, on the other hand, the time T3 is the preparation time taken by the typical image forming apparatus. The time T3 is equal to the sum of the time T1 and the time T2. This shows that the preparation time T1 taken by the image forming apparatus 1 is shorter than the preparation time T3 taken by the typical image forming apparatus.

[Details of Important Parts]

Figure 3:
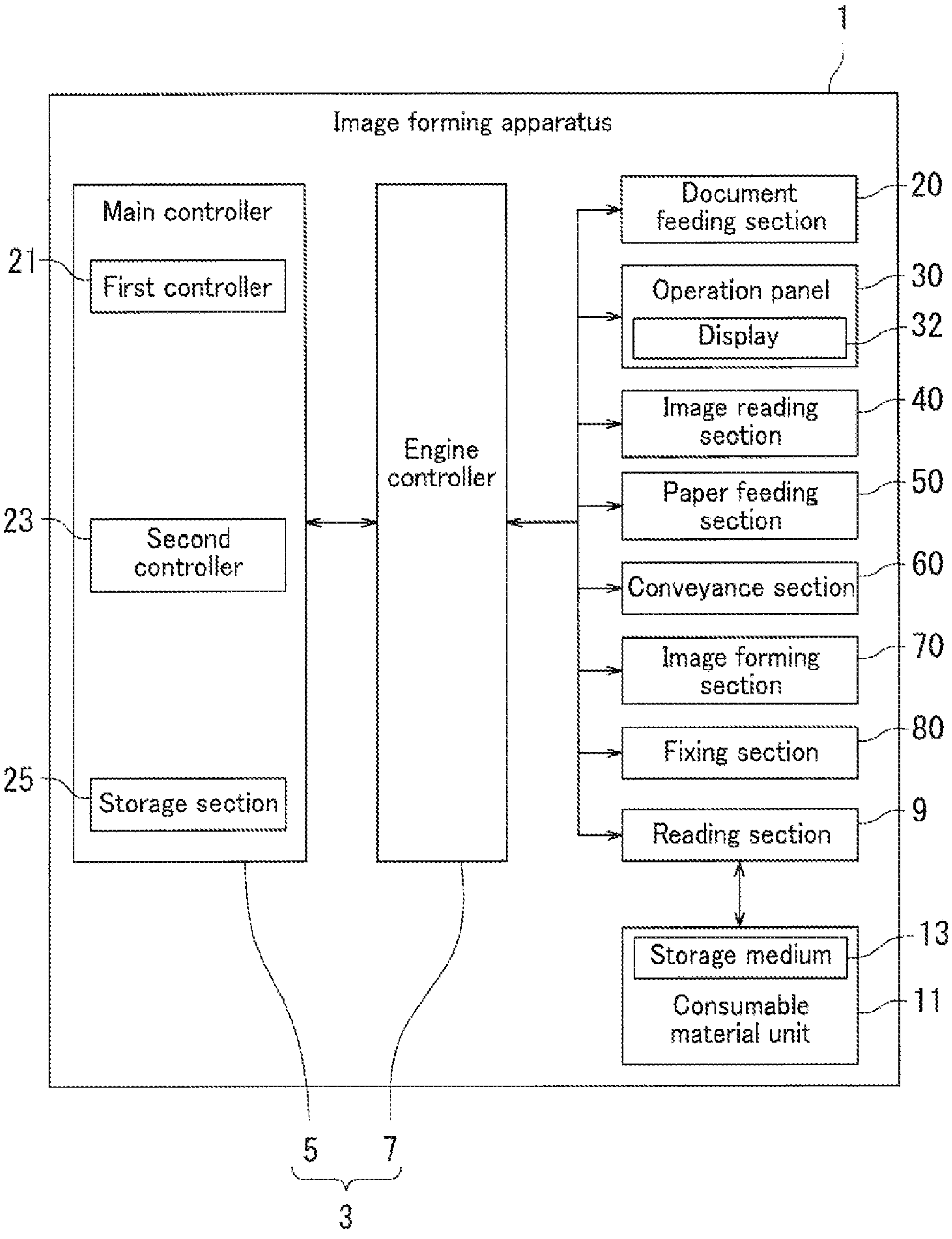
FIG. 3 is a block diagram showing the overall structure of the image forming apparatus according to the embodiment of the present disclosure.
Figure 4:
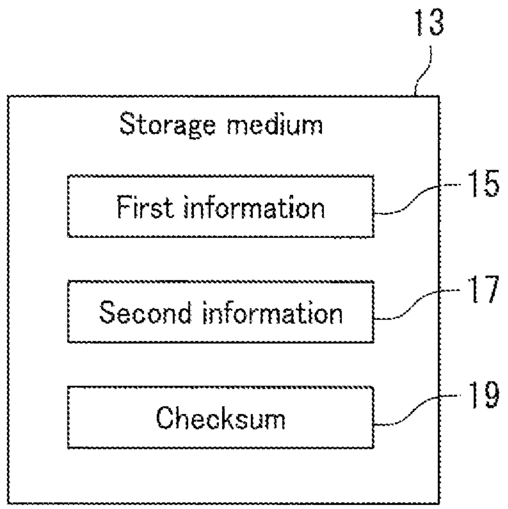
FIG. 4 is a view illustrating the information stored in a storage medium of a consumable material unit according to the embodiment of the present disclosure.

Reference is made to FIGS. 1, 3 and 4. FIG. 3 is a block diagram showing the overall structure of the image forming apparatus 1. FIG. 4 is a view illustrating the information stored in the storage medium 13. The image forming apparatus 1 includes the control section 3, a document feeding section 20, an operation panel 30, an image reading section 40, a paper feeding section 50, a conveyance section 60, an image forming section 70, a fixing section 80, the reading section 9, and the consumable material unit 11. As has been described with reference to FIG. 1, the control section 3 includes the main controller 5 and the engine controller 7. The main controller 5 includes a first controller 21, a second controller 23, and a storage section 25. The operation panel 30 includes a display 32.

The consumable material unit 11 is detachably mounted to the image forming apparatus 1 and contains a consumable material that is to be supplied to the image forming apparatus 1. According to the present embodiment, the consumable material residing (contained) in the consumable material unit 11 is toner, and the consumable material unit 11 is a toner container or a toner cartridge.

The storage medium 13 stores first information 15, second information 17, and a checksum 19. According to the present embodiment, the first information 15 includes: information for determining whether or not the consumable material unit 11 is a genuine product; and/or information indicating the destination region (Japan or North America, for example) of the consumable material unit 11. According to the present embodiment, the second information 17 includes: information indicating the remaining amount of the consumable material; and/or information indicating the number of image formations having been performed (the cumulative number of prints having been produced, for example). The checksum 19 is a code value for checking, which in other words is a code value for the determination. According to the present embodiment, the checksum 19 is computed based on the first information 15 and the second information 17.

The storage medium 13 and the reading section 9 according to the present embodiment together implement radio frequency identification (RFID). For example, the storage medium 13 is a non-volatile memory included in a radio frequency (RF) tag, and the reading section 9 is a reader/writer.

The main controller 5 is implemented by hardware and software for overall control of the image forming apparatus 1. The main controller 5 issues an instruction to the engine controller 7 to indirectly control the respective sections (the document feeding section 20, the operation panel 30, the image reading section 40, the paper feeding section 50, the conveyance section 60, the image forming section 70, the fixing section 80, and the reading section 9) of the image forming apparatus 1. Except for the reading section 9, each section will be described later with reference to FIG. 6. The engine controller 7 is implemented by hardware directly coupled to the respective sections and software. The engine controller 7 directly controls the respective sections autonomously or by following instructions of the main controller 5.

The first controller 21 performs the processing related to the reading of the first information 15 and the second information 17 and also performs the processing for determining whether or not the information stored in the storage medium 13 has been tampered with. The details will be given later with reference to FIG. 5.

The second controller 23 performs the pre-processing. The pre-processing is preparatory processing performed before the image formation is started. The pre-processing involves processing based on the first information 15 notified from the first controller 21. For example, the second controller 23 determines whether or not the consumable material unit 11 is a genuine product. On determining that the consumable material unit 11 is not a genuine product, the second controller 23 displays, on the display 32, a video showing that the consumable material unit 11 is a counterfeit product. For example, the second controller 23 identifies the destination region of the consumable material unit 11 and determines whether or not the identified destination region matches the region where the image forming apparatus 1 is used (in other words, the usage region of the image forming apparatus 1). On determining that the destination region does not match the usage region, the second controller 23 displays, on the display 32, a video showing that the consumable material unit 11 is a parallel imported or reimported product.

The pre-processing involves: processing for placing the respective sections of the image forming apparatus 1 into a standby state after the power is turned on and processing for switching from a sleep state to the standby state. The standby state is where the image formation (printing, for example) is ready to be started immediately upon an input instructing to start the image formation is received via the operation panel 30.

In addition, the second controller 23 performs processing other than the pre-processing (hereinafter, "other processing"). The other processing involves processing based on the second information notified from the first controller 21. In one example, the second controller 23 determines the remaining amount of the consumable material and displays the remaining amount on the display 32. In another example, the second controller 23 determines the number of image formations having been performed and displays the determined number on the display 32. In addition, the other processing involves processing to control the respective sections during or after the image formation on a sheet.

The storage section 25 includes a main storage device (semiconductor memory, for example) and a secondary storage device (semiconductor memory or hard disk drive, for example).

The first controller 21 and the second controller 23 are implemented by an arithmetic device (not shown) executing a computer program stored in the storage section 25. The engine controller 7 is implemented by an arithmetic device (not shown) that controls dedicated circuits (now shown) for controlling the respective sections, through execution of a computer program stored in a storage section (not shown), or according to instructions received from the first controller 21 or the second controller 23. The arithmetic device is a central processing unit (CPU), for example.

[Procedure for Reading Information from Storage Medium]

With reference to FIGS. 3 and 4, the following describes the procedure for reading the first information 15. The first controller 21 requests the engine controller 7 to read the first information 15. The engine controller 7 requests the reading section 9 to read the first information 15. The reading section 9 reads the first information 15 from the storage medium 13 and transmits the first information 15 to the engine controller 7. The engine controller 7 receives the first information 15 and transmits the first information 15 to the first controller 21. Through the procedure as above, the first controller 21 reads the first information 15 from the storage medium 13. Through a similar procedure, the first controller 21 reads the second information 17 and the checksum 19 from the storage medium 13.

Preferably, the first information 15, the second information 17, and the checksum 19 are stored in the storage medium 13 in encrypted form. At the time of reading, the engine controller 7 receives the first information 15, the second information 17, and the checksum 19 all in encrypted form from the reading section 9 and transmits the respective information items to the first controller 21 after decryption.

[Details of Processing]

Figure 5:
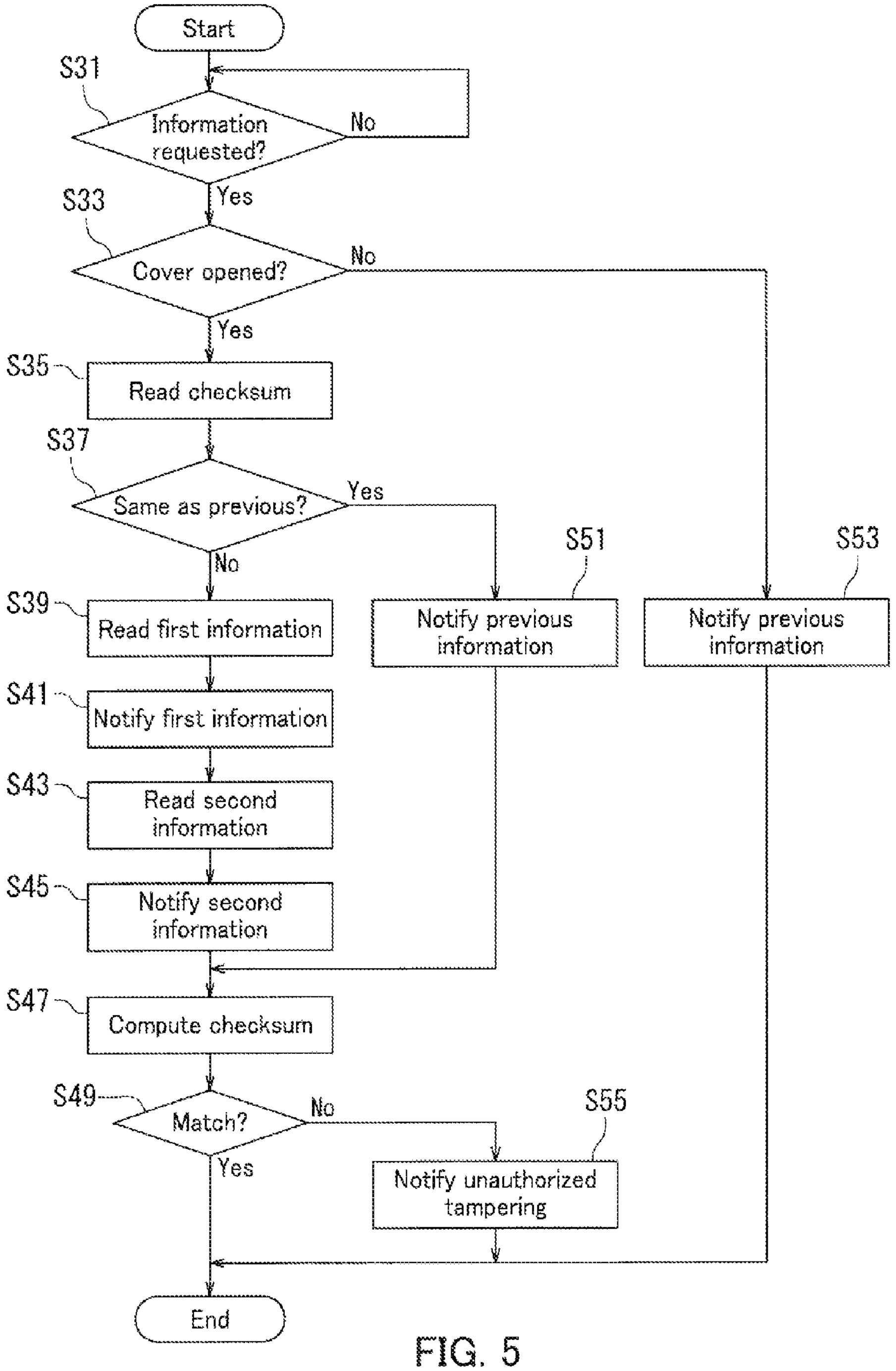
FIG. 5 is a flowchart of processing by a first controller of the image forming apparatus according to the embodiment of the present disclosure.

Reference is made to FIGS. 3-5. FIG. 5 is a flowchart of the processing performed by the first controller 21. The flowchart omits the processing performed when the consumable material unit 11 is without the storage medium 13 and the processing performed when the reading section 9 cannot physically read information from the storage medium 13.

In Step S31, the first controller 21 determines whether or not the second controller 23 has requested to read the information (the first information 15 and the second information 17) from the storage medium 13. For example, the second controller 23 issues a read request to the first controller 21 when the power of the image forming apparatus 1 is turned on or when an instruction for canceling the sleep state is input. On the determination that no request has been issued, the processing goes back to Step S31 (Step S31: No). On the determination that a request has been issued, the processing moves onto Step S33 (Step S31: Yes).

In Step S33, the first controller 21 determines whether or not the cover (not shown) that covers the consumable material unit 11 is opened. The cover is opened to allow replacement of the consumable material unit 11. When the cover is opened, the consumable material unit 11 is exposed and thus can be replaced. On the determination that the cover is not opened, the processing moves to Step S53 (Step S33: No). When the cover is not opened, it means that the consumable material unit 11 has not been replaced with a new one or detached to attach a new one. In Step S53, the first controller 21 notifies the second controller 23 about the immediately previously read information and terminates the processing. The immediately previously read information is the first information 15 and the second information 17 that are read in Steps S39 and S43 in the immediately previous execution of the routine and stored in the storage section 25.

On the other hand, on the determination that the cover is opened, the processing moves onto Step S35 (Step S33: Yes). When the cover is opened, it means that the consumable material unit 11 has been replaced with a new one or detached to attach a new one. In Step S35, the first controller 21 reads the checksum 19 from the storage medium 13. In Step S37, the first controller 21 determines whether or not the newly read checksum 19 matches the immediately previously read checksum 19. On the determination that the respective checksums 19 match, the processing moves onto Step S51 (Step S37: Yes). In Step S51, the first controller 21 notifies the second controller 23 about the immediately previously read information, and the processing moves onto Step S47. Here, the immediately previously read information is the same as the information that is read immediately previously and notified in Step S53.

On the other hand, on the determination that the newly read checksum 19 does not match the immediately previously read checksum 19, the processing moves onto Step S39 (Step S37: No). In Step S39, the first controller 21 reads the first information 15 from the storage medium 13. In Step S41, the first controller 21 notifies the second controller 23 about the first information 15. In Step S43, the first controller 21 reads the second information 17 from the storage medium 13. In Step S45, the first controller 21 notifies the second controller 23 about the second information 17.

In Step S47, the first controller 21 computes the checksum based on the first information 15 and the second information 17. In Step S49, the first controller 21 compares the thus computed checksum with the checksum 19 to determine whether or not the respective checksums match. On the determination that the respective checksums match, the processing ends (Step S49: Yes).

On the other hand, on the determination that the respective checksums do not match, the processing moves onto Step S55 (Step S49: No). When the computed checksum does not match the checksum 19, it means that the first information 15 and/or the second information 17 has been tampered with in an unauthorized manner. In Step S55, the first controller 21 notifies the second controller 23 about the unauthorized tampering, and then the processing ends. Upon receipt of the notification, the second controller 23 informs the user by displaying, on the display 32, a video showing that the unauthorized tampering has occurred.

As has been described with reference to FIGS. 3-5, the first controller 21 according to the present embodiment determines whether or not any of the first information 15 and the second information 17 stored in the storage medium 13 has been tampered with (Step S49: Determining unauthorized tampering), after notifying the second controller 23 about the first information 15 and the second information 17 (after Steps S41 and S45). Consequently, although the tamper detection is performed, the preparation time can be shortened as compared with the case where tamper detection is performed before the second controller 23 is notified about the first information 15 and the second information 17.

[Operation of Respective Sections of Image Forming Apparatus]

Figure 6:
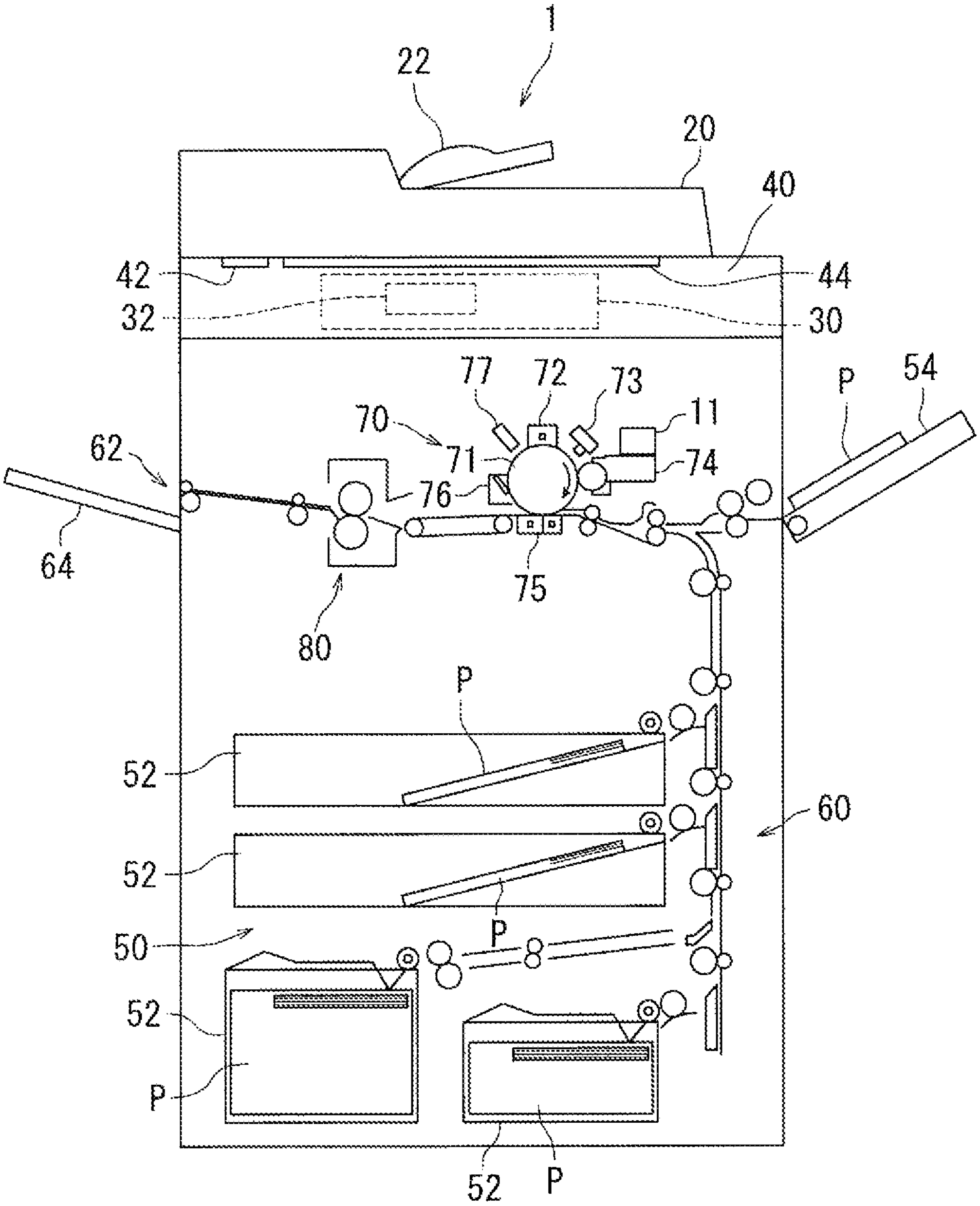
FIG. 6 is a schematic sectional view illustrating an overview of the image forming apparatus according to the present disclosure.

With reference to FIGS. 3 and 6, the following describes the operation of the respective sections of the image forming apparatus 1. FIG. 6 is a schematic sectional view illustrating an overview of the image forming apparatus 1 according to the present disclosure. The image forming apparatus 1 is a copier, a printer, or a facsimile machine, for example. In another example, the image forming apparatus 1 is a multifunction peripheral combining the functions of the two or more of a copier, a printer, and a facsimile machine.

The document feeding section 20 fetches original documents one by one from a document table 22, automatically feeds each document toward contact glass 42, and then discharges the original document. The image reading section 40 includes the contact glass 42 and contact glass 44. The image reading section 40 reads an image of the original document through the contact glass 42 or 44 to generate image data. The operation panel 30 functions as an input section for establishing various settings and also as a display section for displaying various types of information. The display 32 is a touch panel.

The paper feeding section 50 includes a plurality of paper feed cassettes 52 and a manual feed tray 54. Each paper feed cassette 52 is loaded with sheets P. The manual feed tray 54 is for placing sheets P to be fed manually. Each sheets P is fed from one of the paper feed cassettes 52 or the manual feed tray 54 to the conveyance section 60.

The conveyance section 60 conveys the sheet P to the image forming section 70. The image forming section 70 forms an image on the sheet P in the following manner. The image forming section 70 includes a photosensitive drum 71, a charging section 72, an exposing section 73, a developing section 74, a transfer section 75, a cleaning section 76, and a static eliminating section 77.

The charging section 72 charges the surface of the photosensitive drum 71. The exposing section 73 illuminates the surface of the photosensitive drum 71 with light according to the image data generated by the image reading section 40. As a result, an electrostatic latent image is formed on the surface of the photosensitive drum 71.

The developing section 74 develops the electrostatic latent image formed on the surface of the photosensitive drum 71 to form a tone image on the surface of the photosensitive drum 71. As the sheet P is passed between the photosensitive drum 71 and the transfer section 75, the transfer section 75 transfers the toner image to the sheet P.

The sheet P having the toner image transferred thereto is conveyed toward the fixing section 80. The fixing section 80 applies heat and pressure to the sheet P to fix the toner image to the sheet P. An exit roller pair 62 discharges the sheet P onto an exit tray 64.

The cleaning section 76 removes the residual toner from the surface of the photosensitive drum 71. The static eliminating section 77 removes the residual charges from the surface of the photosensitive drum 71.

The consumable material unit 11 is mounted above the development section 74. The consumable material unit 11 (toner container, in the present embodiment) contains the consumable material (toner, in the present embodiment) and supplies the consumable material to the development section 74. The consumable material unit 11 is consumable and needs to be replaced with a new consumable material unit 11 appropriately when the remaining amount of the consumable material is low.

As has been described with reference to FIGS. 1-6, according to the present embodiment, the information that needs to be stored in the storage medium 13 is divided into the first information 15 and the second information 17 to be stored in the storage medium 13. Then, the first controller 21 first reads the first information 15 and notifies the second controller 23. Thus, the second controller 23 can start the pre-processing without having to wait for the second information 17. As a consequence, the preparation time can be shortened.

Note that the present disclosure is not limited to the embodiment described above and may be practiced through various other modes without departing from the gist of the present disclosure. For example, variations including the following are possible.

(1) In the example shown in FIG. 3, the consumable material unit 11 is a toner container or a toner cartridge, and the consumable material is toner. However, the consumable material unit 11 and the consumable material are not limited to such. For example, the consumable material unit 11 may be a case containing the consumable material. In one example, the consumable material is ink, and the consumable material unit 11 is an ink tank or an ink cartridge. In another example, the consumable material is a developing agent, and the consumable material unit 11 is a developing unit. In a yet another example, the consumable material is a photosensitive material, and the consumable material unit 11 is a photosensitive unit.

(2) In the example shown in FIG. 4, the information to be stored into the storage medium 13 is divided into two pieces, namely the first information 15 and the second information 17. Alternatively, however, the information may be divided into three or more pieces.

(3) In the example shown in FIGS. 4 and 5, a checksum, which is a type of error detection code, is computed to detect unauthorized tampering. However, the detection scheme is not limited to such. For example, a hash value or a cyclic redundancy check (CRC) value, each of which is a type of error detection code, may be computed to detect unauthorized tampering. In this case, either a hash value or a CRC value obtained based on the first information 15 and the second information 17 is used instead of the checksum 19. In addition, in Step S47 of FIG. 5, the first controller 21 computes the hash value or the CRC value based on the first information 15 and the second information 17.

(4) In the example shown in FIG. 5, the first controller 21 performs the detection of unauthorized tampering on both the first information 15 and the second information 17. Alternatively, however, the tamper detection may be performed only on the first information 15 or the second information 17.

(5) In the example shown in FIG. 3, the reading section 9 and the storage medium 13 together implement RFID to read information in a non-contact manner. Yet, the information may be read in a different contact or non-contact manner. For example, the storage medium 13 may be a contact-type integrated circuit (IC), and the reading section 9 may be a reader or a reader/writer compatible with the contact-type IC.

(6) The present disclosure is applicable in the field of image forming apparatuses using a consumable material that needs replacing appropriately.

What is claimed is:

1. An image forming apparatus for forming an image on a sheet by using a consumable material contained in a consumable material unit, the consumable material unit including a storage medium storing first information and second information, the image forming apparatus comprising:

a control section; and a reading section configured to read the first information from the storage medium and transmit the first information to the control section before reading the second information, and read the second information from the storage medium and transmit the second information to the control section after transmitting the first information to the control section, wherein the first information is essential for processing for starting the image formation, the second information is processable by the control section during or after the image formation, and the control section performs the processing for starting the image formation in parallel with the reading of the second information by the reading section such that the processing for starting the image formation completes during the reading of the second information or is continued until during the transmission of the second information to the control section.

2. An image forming apparatus according to claim 1, wherein the first information includes information for determining whether or not the consumable material unit is a genuine product and/or information indicating a destination region of the consumable material unit.

3. An image forming apparatus according to claim 1, wherein the second information includes information indicating a remaining amount of the consumable material and/or information indicating the number of image formations.

4. An image forming apparatus according to claim 1, wherein the control section determines whether or not the first information and/or the second information stored in the storage medium has been tampered with.

5. An image forming apparatus according to claim 4, wherein the control section includes a first controller, and a second controller, the first controller determines whether or not the first information and/or the second information stored in the storage medium has been tampered with, after notifying the second controller about the first information and the second information, and the second controller performs the processing for starting the image formation and processing based on the second information.

6. An image forming apparatus according to claim 1, wherein the storage medium and the reading section together implement RFID, and the storage medium is a non-volatile memory included in an RF tag.

7. An image forming apparatus according to claim 5, wherein the first controller computes an error detection code to determine whether or not the first information and/or the second information stored in the storage medium has been tampered with, and the storage medium stores a code value for the determination.

8. An image forming apparatus according to claim 5, further comprising a display, wherein the second controller determines whether or not the consumable material unit is a genuine product, and on determining that the consumable material unit is not a genuine product, displays on the display a video showing that the consumable material unit is a counterfeit product, or identifies the destination region of the consumable material unit to determine whether or not the identified destination region matches a usage region of the image forming apparatus, and on determining that the destination region does not match the usage region, displays on the display a video showing that the consumable material unit is a parallel imported or reimported product.

9. A consumable material unit detachably mounted to an image forming apparatus and containing a consumable material to be supplied to the image forming apparatus, the image forming apparatus including a control section and a reading section, the consumable material unit comprising:

a storage medium storing first information and second information, wherein the image forming apparatus forms an image on a sheet by using the consumable material, the first information is essential for processing for starting the image formation, the second information is processable by the control section during or after the image formation, the reading section reads the first information from the storage medium and transmits the first information to the control section before reading the second information, and reads the second information from the storage medium and transmits the second information to the control section after transmitting the first information to the control section, and the control section performs the processing for starting the image formation in parallel with the reading of the second information by the reading section such that the processing for starting the image formation completes during the reading of the second information or is continued until during the transmission of the second information to the control section.

10. A storage medium for attachment to a consumable material unit that is detachably mounted to an image forming apparatus, the image forming apparatus including a control section and a reading section, the storage medium comprising first information and second information stored therein, wherein the image forming apparatus forms an image on a sheet by using a consumable material contained in the consumable material unit, the first information is essential for processing for starting the image formation, the second information is processable by the control section during or after the image formation, the reading section reads the first information from the storage medium and transmits the first information to the control section before reading the second information, and reads the second information from the storage medium and transmits the second information to the control section after transmitting the first information to the control section, and the control section performs the processing for starting the image formation in parallel with the reading of the second information by the reading section such that the processing for starting the image formation completes during the reading of the second information or is continued until during the transmission of the second information to the control section.

11. An image forming apparatus according to claim 5, wherein the first controller determines whether or not a cover that covers the consumable material unit is opened, and on determining that the cover is not opened, notifies the second controller about the first information and the second information that are read previously.

12. An image forming apparatus according to claim 5, wherein the first controller determines whether or not a cover that covers the consumable material unit is opened, on determining that the cover is opened, reads an error detection code from the storage medium and determines whether or not the read error detection code matches an error detection code that is read previously, and on determining that the respective error detection codes match, notifies the second controller about the first information and the second information that are read previously.

13. An image forming apparatus according to claim 5, wherein the first controller determines whether or not a cover that covers the consumable material unit is opened, on determining that the cover is opened, reads an error detection code from the storage medium and determines whether or not the read error detection code matches an error detection code that is read previously, on determining that the respective error detection codes do not match, reads the first information from the storage medium and notifies the second controller about the first information, and after notifying the second controller about the first information, reads the second information from the storage medium and notifies the second controller about the second information.

14. An image forming apparatus according to claim 13, wherein the first controller computes an error detection code based on the first information and the second information after notifying the second controller about the second information, compares the computed error detection code with the error detection code read from the storage medium and determines whether or not the respective error detection codes match, and on determining that the respective detection codes do not match, notifies the second controller that the first information and/or the second information stored in the storage medium has been tampered with.

* * * * *